United States Patent
Cho et al.

(10) Patent No.: US 7,506,089 B2
(45) Date of Patent: Mar. 17, 2009

(54) BUS SYSTEM AND METHOD THEREOF

(75) Inventors: Seoung-Hwan Cho, Suwon-si (KR); Min-Do Kwon, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 342 days.

(21) Appl. No.: 11/053,900

(22) Filed: Feb. 10, 2005

(65) Prior Publication Data

US 2005/0177664 A1    Aug. 11, 2005

(30) Foreign Application Priority Data

Feb. 11, 2004    (KR) ...................... 10-2004-0008973

(51) Int. Cl.
   *G06F 13/00*    (2006.01)
   *G06F 13/42*    (2006.01)
   *G06F 13/38*    (2006.01)
   *G06F 13/36*    (2006.01)

(52) U.S. Cl. ...................... 710/110; 710/305

(58) Field of Classification Search .................. 710/110, 710/305
   See application file for complete search history.

(56) References Cited

U.S. PATENT DOCUMENTS

| | | | |
|---|---|---|---|
| 6,353,867 B1* | 3/2002 | Qureshi et al. | 710/305 |
| 6,587,905 B1* | 7/2003 | Correale, Jr. et al. | 710/107 |
| 6,629,223 B2* | 9/2003 | Bachot et al. | 711/167 |
| 7,035,985 B2* | 4/2006 | Bachot et al. | 711/167 |
| 7,058,918 B2* | 6/2006 | Abramovici et al. | 716/12 |
| 7,107,365 B1* | 9/2006 | Clark | 710/35 |
| 2002/0016706 A1* | 2/2002 | Cooke et al. | 703/20 |
| 2003/0110363 A1* | 6/2003 | Bachot et al. | 711/167 |
| 2004/0212393 A1* | 10/2004 | Abramovici et al. | 326/38 |
| 2004/0225769 A1* | 11/2004 | Pezzini | 710/113 |
| 2005/0204084 A1* | 9/2005 | Joe et al. | 710/113 |

FOREIGN PATENT DOCUMENTS

| | | |
|---|---|---|
| JP | 5-94407 A | 4/1993 |
| JP | 2002-123484 A | 4/2002 |
| JP | 2002-140290 A | 5/2002 |
| JP | 2002-278923 A | 9/2002 |

OTHER PUBLICATIONS

Lysecky et al.; "Prefetching for Improved Bus Wrapper Performance in Cores"; ACM Press; ACM Transactions on Design Automation of Electronic Systems; vol. 7, Issue 1; Jan. 2002; pp. 58-90.*

(Continued)

*Primary Examiner*—Paul R Myers
*Assistant Examiner*—Ryan M Stiglic
(74) *Attorney, Agent, or Firm*—Harness, Dickey & Pierce PLC (57) ABSTRACT

A bus system including first and second blocks. The bus system is configured such that data may be transferred at the first block at the same time that data may be transferred at the second block.

36 Claims, 5 Drawing Sheets

OTHER PUBLICATIONS

ARM Limited; "AHB CPU Wrappers Technical Reference Manual"; ARM Limited; Issue B; May 18, 2001; all pages.*

Bertola et al.; "A methodology for the design of AHB bus master wrappers"; IEEE; Proceedings of the Euromicro Symposium on Digital System Design; Sep. 6, 2006; pp. 90-95.*

Zhang et al.; "The design of AMBA AHB/VCI wrapper"; IEEE; Proceedings of the 5th International Conference on ASIC; vol. 1; Oct. 24, 2003; pp. 438-442.*

Anjo et al; "NECoBus: a high-end SOC bus with a portable and low-latency wrapper-based interface mechanism"; IEEE; Custom Integrated Circuits Conference; Aug. 7, 2002; pp. 315-318.*

AHB CPU Wrappers Technical Reference Manual, Apr. 18, 2001.

NECoBus: A high-end SOC bus with a portable & low-latency wrapper-based interface mechanism; Kenichiro Anjo et al., May 15, 2002.

AMBA Specification; May 13, 1999.

* cited by examiner

Fig. 1

(PRIOR ART)

(PRIOR ART)

BUS SYSTEM AND METHOD THEREOF

CROSS-REFERENCE TO RELATED APPLICATIONS

This U.S. non-provisional patent application claims priority under 35 U.S.C. § 119 of Korean Patent Application 2004-08973 filed on Feb. 11, 2004, the entire contents of which are hereby incorporated by reference.

BACKGROUND OF THE INVENTION

1. Field of this Invention

The present invention relates generally to bus systems in a System-On-Chip (SOC), and more particularly, to a bus system allowing simultaneous data transfers.

2. Description of Prior Art

Bus systems may allow communication between a plurality of Intellectual Property (IP) cores on a chip. Advanced High-performance Bus (AHB) systems based on an Advanced Microcontroller Bus Architecture (AMBA) protocol have been increasingly used in recent years. Thus, IP cores may be designed based on the AMBA protocol.

In order to reduce a time-to-market for IP cores, IP cores may be recycled (i.e., reused). This recycling may shorten a design time and improve reliability of chips. One example of a bus system using the above-described recycled IP cores is a Silicon Backplane (SB) micro-network based on an Open Core Protocols (OCP).

Figure 1:
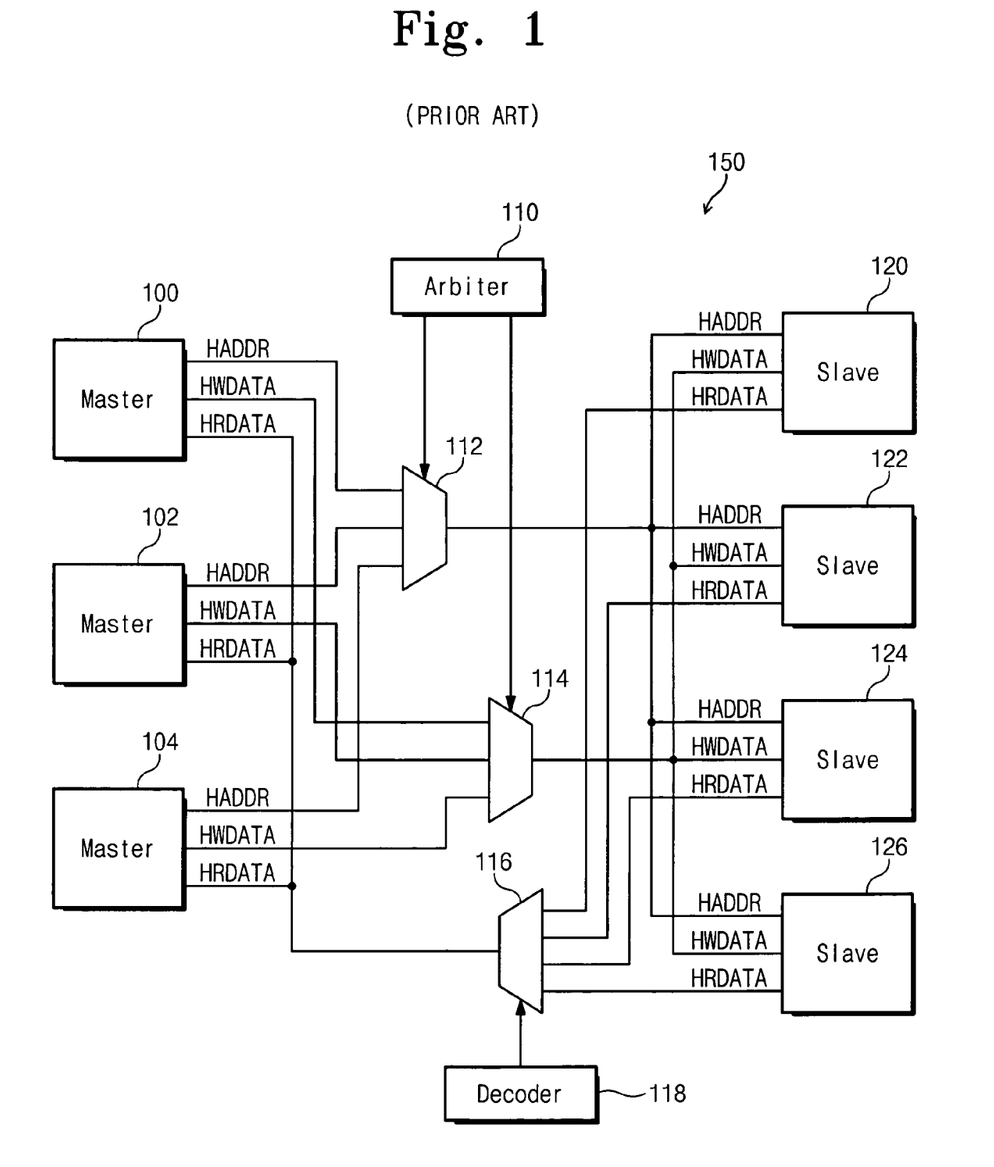
FIG. 1 illustrates a block diagram of an AHB bus system.

FIG. 1 illustrates a block diagram of an AHB bus system 150.

Referring to FIG. 1, the AHB bus system 150 may be based on the AMBA protocol (e.g., AMBA protocol specification 2.0). The AHB bus system 150 may include masters 100/102/104, slaves 120/122/124/126, an arbiter 110, and/or a decoder 118. The AHB bus system 150 may further include a plurality of multiplexer (MUX) circuits 112/114/116 for controlling data-flow between the masters 100/102/104 and the slaves 120/122/124/126. The MUX circuits 112/114/116 may be controlled by the arbiter 110 and/or the decoder 118.

One of the masters 100/102/104 may request bus access from the arbiter 110 to designate a connection between one of the masters 100/102/104 and one of the slaves 120/122/124/126 via the bus. After the bus connection is assigned, data may be transferred (e.g., read and/or written) between a selected one of the masters 100/102/104 and a selected one of the slaves 120/122/124/126.

For example, master 100 may request bus access from the arbiter 110 by submitting a bus-use-request HBUSREQ1 in order to write data to slave 124. The arbiter 110 may determine whether the slave 124 is available (i.e., whether another one of the masters 100/102/104 is currently communicating with the slave 124). If the slave 124 is available, the arbiter 110 may apply a bus-grant-signal HGRANT to the master 100. The arbiter 110 may control the first and second MUX circuits 112 and 114, respectively, so as to transmit data HWDATA1 from the master 100 to the slave 124. The first MUX circuit 112 may transmit an address signal HADDR and a control signal from the master 100 to the slave 124, and the second MUX circuit 114 may transmit data HWDATA from the master 100 to the slave 124. If the data is transmitted from the master 100, the slave 124 may apply a signal indicating that the data is transmitted from the master 100. When data is transmitted from the master 100, a data transmission state signal HREADY may be applied from the master 100 to the slave 124 by a third MUX circuit 116 which may be controlled by a decoder 118.

Figure 2A:
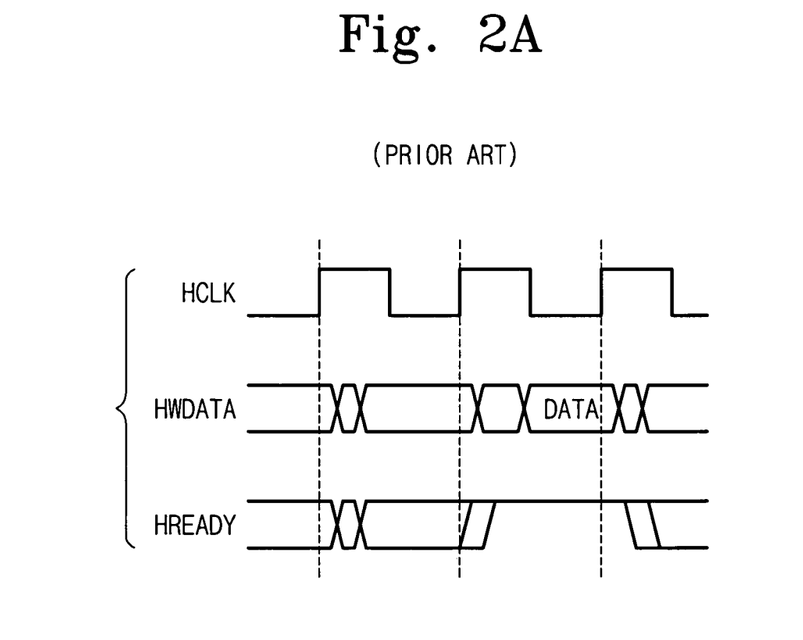
FIG. 2A illustrates a timing diagram of signals HCLK, HWDATA, and HREADY for the AHB bus system of FIG. 1 when one of the masters transmits data over a single cycle.

FIG. 2A illustrates a timing diagram of signals HCLK, HWDATA, and HREADY for the AHB bus system 150 of FIG. 1 when one of the masters 100/102/104 transmits data over a single cycle.

Figure 2B:
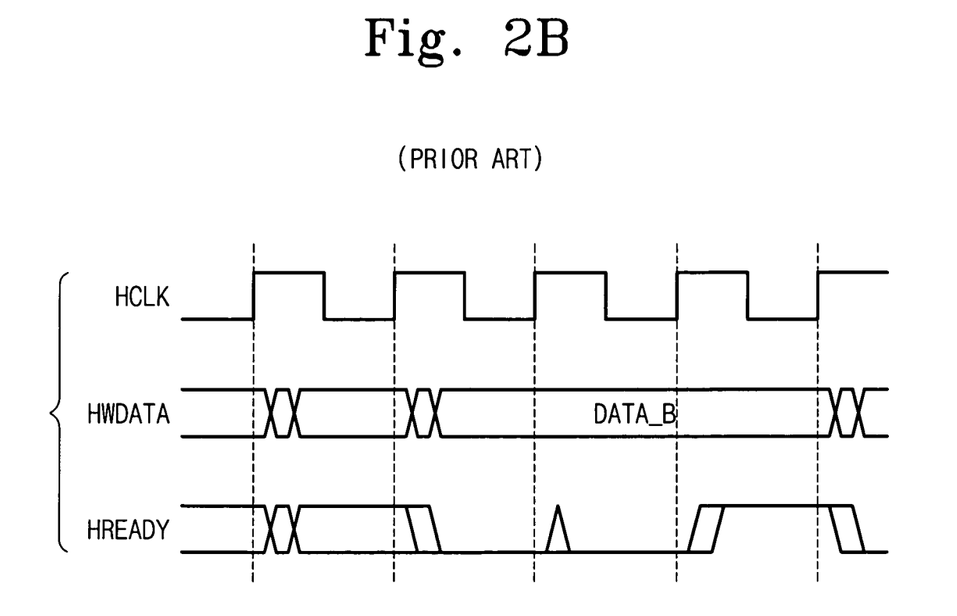
FIG. 2B illustrates a timing diagram of signals HCLK, HWDATA, and HREADY for the AHB bus system of FIG. 1 when one of the masters transmits data over several cycles.

FIG. 2B illustrates a timing diagram of signals HCLK, HWDATA, and HREADY for the AHB bus system 150 of FIG. 1 when one of the masters 100/102/104 transmits data over several cycles.

Referring to FIG. 2A, when the data HWDATA from one of the masters 100/102/104 is transmitted during one cycle, the data transmission state signal HREADY from the slave 120/122/124/126 (i.e., the slave which receives the data) maintains a high state (i.e., a high logic or voltage level). In contrast, referring to FIG. 2B, when data DATA_B is transmitted from one of the masters 100/102/104 to the slave 120/122/124/126 (i.e., the slave which receives the data) during several cycles, the data transmission state signal HREADY may maintain a low state (i.e., a low logic or voltage level) until the data DATA_B is completely transmitted.

Referring to FIGS. 2A and 2B, when the data transmission state signal HREADY is in the low state, the DATA and/or DATA_B may be transmitted. However, operations beyond the single allowed data transfer may not be possible when the data transmission state signal HREADY is in the low state. Thus, if the data transmission state signal HREADY is in a low state, the AHB bus system 150 may be considered to be in a wait state (i.e., other operations must wait for data transfer to complete before continuing).

Figure 3:
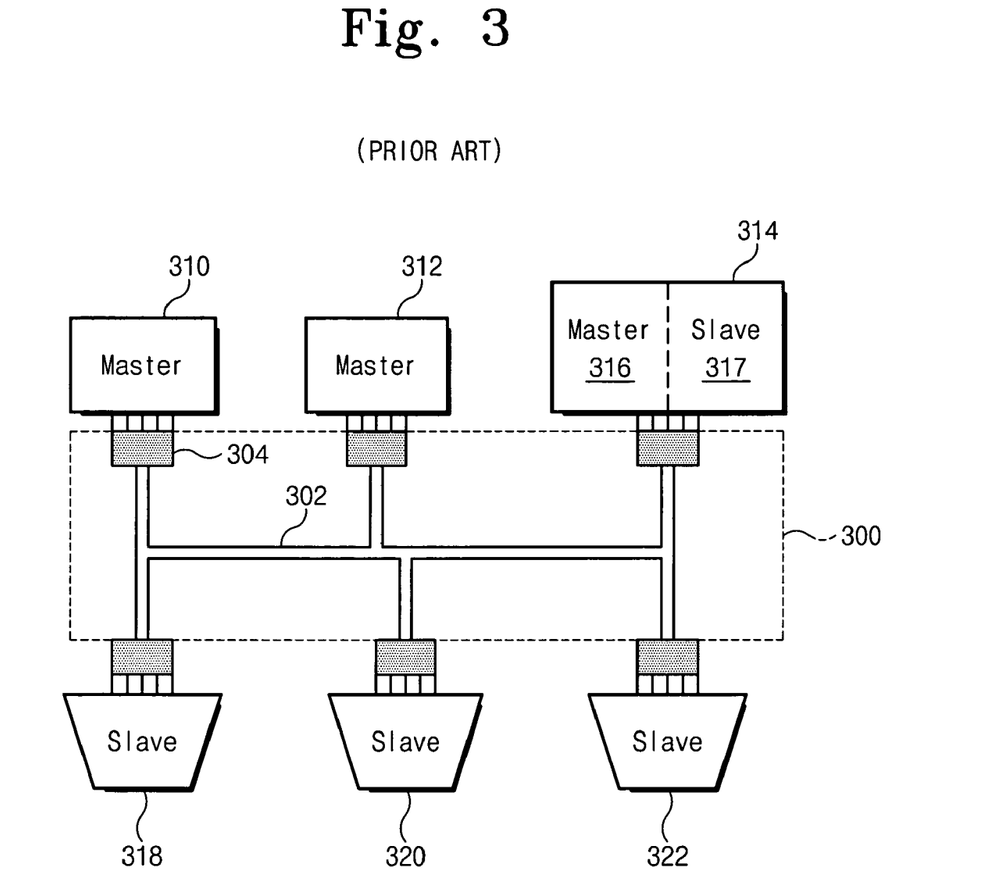
FIG. 3 illustrates a block diagram of a silicon backplane (SB) micro-network based on an Open Core Protocol (OCP).

FIG. 3 illustrates a block diagram of a SB micro-network 300 based on OCP.

Referring to FIG. 3, the SB micro-network 300 may include an SB bus 302 and a plurality of agents 304. Each of the plurality of agents 304 may be connected to at least one of IP cores 310/312/314/318/320/322, each of which may be operated by a master and/or a slave. The SB bus 302 may be tree-shaped, as shown in FIG. 3, or ring-shaped. The plurality of agents 304 may connect the IP cores 310/312/314/318/320/322 to the SB bus 302.

In another method, referring to FIG. 3, the IP cores 310/312/314/318/320/322 may be classified into two types; namely, a first type may be characterized by being operated only by masters (e.g., masters 310/312) or only by slaves (e.g., slaves 318/320/322), and a second type may be characterized by being operated by at least one master and at least one slave (e.g., master 316 and slave 317), similar to an IP core based on a register.

In another method, the IP cores 310 may be based on the AMBA protocol of FIG. 3. If the master enters the wait state (i.e., the HREADY signal may be in a low state) when data is transferred in the IP core operated by both the master and the slave (i.e., similar to the second type described above), the slave may not perform any operation until the wait state is over.

In an example, if the slave is a register for setting an operation state (e.g., writing, reading, waiting, etc. ...) of the master 316, the setting of the register may be changed when the master 316 enters the wait state. Thus, the wait state of the master 316 may function as a wait state of the entire IP core (i.e., all operations other than the data transfer are halted within the IP core).

BRIEF DESCRIPTION OF THE DRAWINGS

The present invention will become more apparent by describing in detail example embodiments thereof with reference to the attached drawings in which.

SUMMARY OF THE INVENTION

An exemplary embodiment of the present invention is a bus system, including a first Intellectual Property (IP) core including a master block and a slave block, and a wrapper connecting the master block and the slave block to a bus, the wrapper applying a first data transmission state signal to the master block and a second data transmission state signal to the slave block, the first and second data transmission state signals indicating a permission to transfer data.

Another exemplary embodiment of the present invention is a bus system, including a plurality of wrappers connecting a plurality of Intellectual Property (IP) cores to a bus, at least one of the plurality of IP cores including a master block and a slave block, and wherein one of the plurality of wrappers, connected to the at least one of the plurality of IP cores, applies a first data transmission state signal to the master block and a second transmission state signal to the slave block, the first and second data transmission state signals indicating a permission to transfer data.

Another exemplary embodiment of the present invention is a bus system, including a first Intellectual Property (IP) core including a master block and a slave block, a master wrapper connecting the master block to a bus, the master wrapper applying a first data transmission state signal to the master block, the first data transmission state signal indicating a permission of data transfer, and a slave wrapper connecting the slave block to the bus, wherein the master wrapper, the slave wrapper applying a second data transmission state signal to the slave block, the second data transmission state signal indicating a permission to transfer data.

Another exemplary embodiment of the present invention is a method of operation for a bus system, including connecting a first Intellectual Property (IP) core including a master block and a slave block to a bus via a wrapper, the wrapper applying a first data transmission state signal to the master block and a second data transmission state signal to the slave block, the first and second data transmission state signals indicating a permission to transfer data.

Another exemplary embodiment of the present invention is a bus system, including a first Intellectual Property (IP) core transferring data at a first time interval, and a second IP core connected to the first IP core through a bus and transferring data at a second time interval, a portion of the second time interval overlapping with a portion of the first time interval.

Another exemplary embodiment of the present invention is a method of transferring data, including transferring data at a first Intellectual Property (IP) core at a first time interval, and transferring data at a second IP, the second IP being connected to the first IP through a bus, at a second time interval, a portion of the second time interval overlapping with a portion of the first time interval.

DETAILED DESCRIPTION OF THE EXEMPLARY EMBODIMENTS OF THE PRESENT INVENTION

Hereinafter, exemplary embodiments of the present invention will be described in detail with reference to the accompanying drawings.

Figure 4:
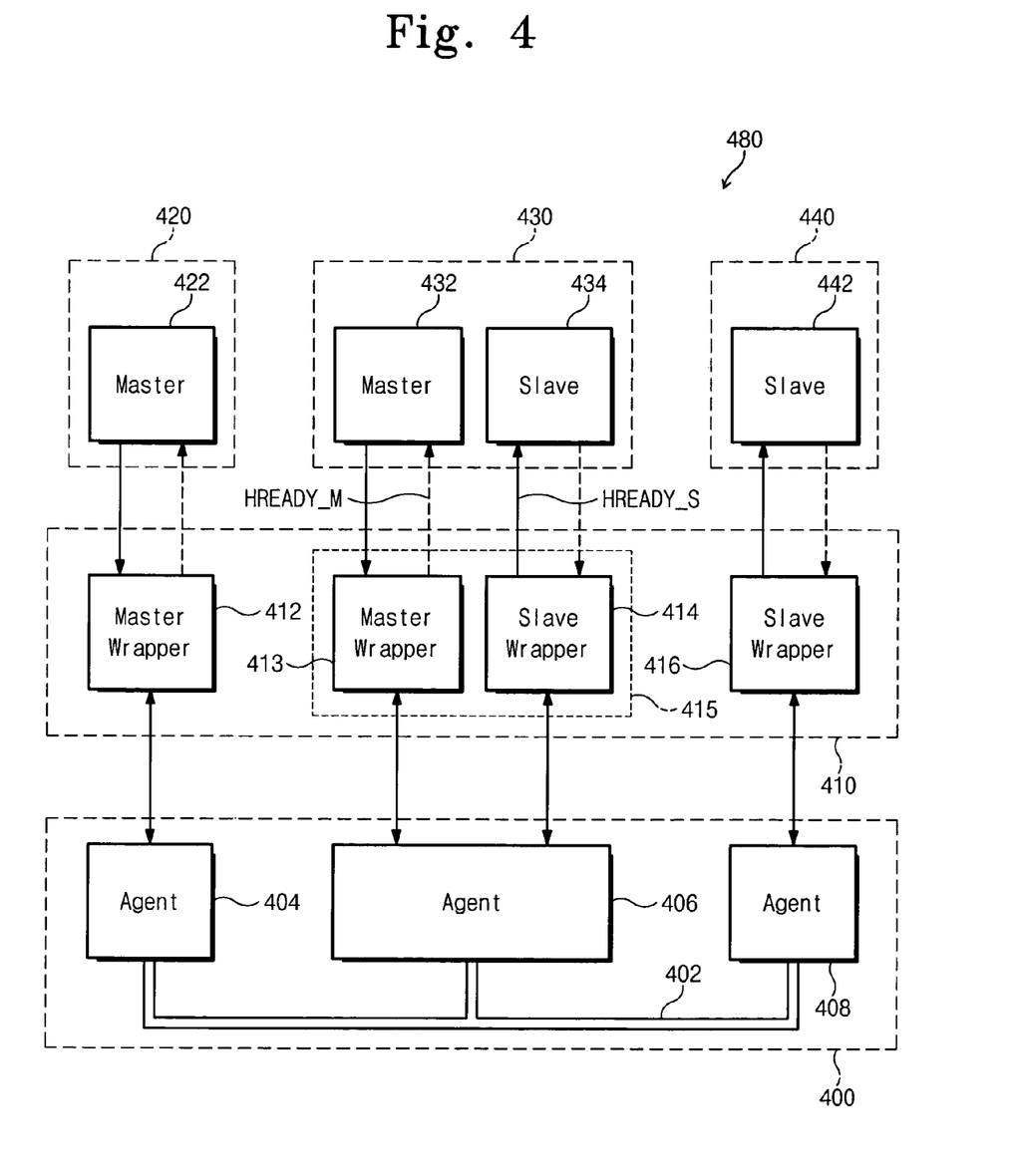
FIG. 4 illustrates a block diagram of a SB bus system according to an exemplary embodiment of the present invention.

FIG. 4 illustrates a block diagram of a silicon backplane (SB) bus system 480 according to an exemplary embodiment of the present invention.

In another exemplary embodiment of the present invention, referring to FIG. 4, the SB bus system 480 may include a SB micro-network 400 based on an open core protocol (OCP), a wrapper block 410 and a plurality of IP cores 420/430/440 based on an AMBA protocol.

In another exemplary embodiment of the present invention, referring to FIG. 4, the SB micro-network 400 may be connected to a SB bus 402 based on OCP and a wrapper block 410 to provide a connection between the IP cores 420/430/440 and the SB bus 402. The SB micro-network 400 may further include agents 404/406/408 which may execute SB micro-network protocol.

In another exemplary embodiment of the present invention, the wrapper block 410 may be connected to respective IP cores 420/430/440 and may also connect to the agents 404/406/408, thereby forming a connection between the IP cores 420/430/440 and the agents 404/406/408. In other words, the wrapper block 410 may form a connection between the IP cores 420/430/440 and the SB micro-network 400. The wrapper block 410 may further convert the AMBA protocol into the OCP and/or the OCP into the AMBA protocol.

In another exemplary embodiment of the present invention, the first IP core 420 may function as a master, the second IP core 430 may function as both a master and a slave, and the third IP core 440 may function as a slave. Accordingly, the first IP core 420 may include a master block 422, the second IP core 430 may include a master block 432 and a slave block 434, and the third IP core 440 may include a slave block 442. The master blocks 422 and 432 may be connected to master wrappers 412 and 413, respectively, and may thereby be connected to the SB bus 402 via the agents 404 and 406, respectively. The slave blocks 434 and 442 may be connected to slave wrappers 414 and 416, respectively, and may thereby be connected to the SB bus 402 by the agents 406 and 408, respectively.

In another exemplary embodiment of the present invention, a wrapper 415 may be connected to the second IP core 430. The wrapper 415 may include a master wrapper 413 and/or a slave wrapper 414. The wrapper 415 may output a first data transmission state signal HREADY_M (i.e., from the master wrapper 413) to the master block 432 and a second data transmission state signal HREADY_S (i.e., from the slave wrapper 414) to the slave block 434.

In another exemplary embodiment of the present invention, the slave data transmission state signal HREADY_S may be maintained at a first state (i.e., at a first logic or voltage level), which may enable the slave block 434 to receive data irrespective of an operation state (e.g., reading data, writing data, etc. . . . ) of the master block 432.

In another exemplary embodiment of the present invention, the first state may be a high logic or voltage level.

In another exemplary embodiment of the present invention, the first state may be a low logic or voltage level.

In an exemplary embodiment of the present invention, a second state may be a high logic or voltage level.

In another exemplary embodiment of the present invention, the second state may be a low logic or voltage level.

In another exemplary embodiment of the present invention, when the master block 432 is in a wait state (i.e., HREADY_M is in the second state), and a request to transfer data from another master block (e.g., the master block 422) to the slave block 434 is received, the data request may be acknowledged.

In another example, when the master block 432 enters a wait state during data transfer, there may be a reset of the register (i.e., slave block) for setting an operation (e.g., write, read, etc.) of the master block 432. In this example, the data may be received by the slave block 434 by applying the master data transmission state signal HREADY_M and the slave data transmission state signal HREADY_S and the slave data transmission state signal HREADY_S may be maintained in the first state (i.e., a high or a low logic level) irrespective of the operation of the master block 432.

Figure 5:
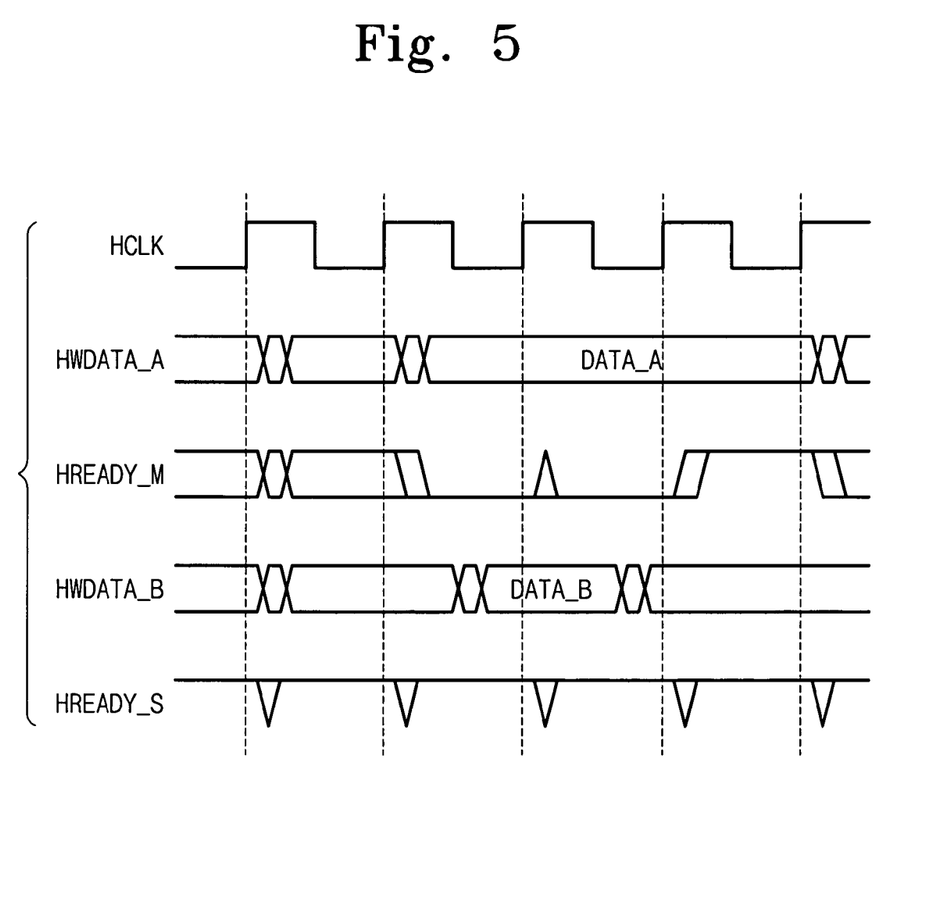
FIG. 5 illustrates a timing diagram of a data transmission including a data transmission state signal applied to each of a master block and a slave block in the SB bus system of FIG. 4.

FIG. 5 illustrates a timing diagram of a data transmission including a data transmission state signal applied to each of a master block and a slave block in the SB bus system of FIG. 4.

In another exemplary embodiment of the present invention, referring to FIG. 5, data DATA_B may be received from the first IP core 420 when the master block 432 is in a wait state by maintaining the slave data transmission state signal HREADY_S in the first state.

In another exemplary embodiment of the present invention, when IP cores based on the AMBA protocol are applied to a bus based on OCP, a bus system (e.g., bus system 480) may enable an operation of a slave block during data transfer of a master block of the IP core. Thus, the bus efficiency (i.e., the number of possible data transfers at a given time) may be increased.

The exemplary embodiments of the present invention being thus described, it will be obvious that the same may be varied in many ways. For example, the bus system may not be limited to an OCP and/or an AMBA protocol, but may be configured to operate with any well-known bus protocol.

Further, examples of buses (e.g., SB bus 402) have been above-described as SB buses. However, any well-known bus structure may be used in any exemplary embodiment of the present invention.

Further, the master blocks (e.g., master blocks 422/432) may be implemented as a central processing unit (CPU) and/or any other well-known electronic device.

Further, the slave blocks (e.g., slave blocks 434/442) may be implemented as a register, a read-only memory (ROM), a flash memory device and/or any other type of memory device and/or electronic device.

Further, examples of agents (e.g., agents 404/406/408) have been above-described as executing a SB micro-network protocol. However, agents may execute any well-known network protocol.

Further, examples of wrappers (e.g., master wrapper 413, slave wrapper 414, wrappers 415, etc. . . . ) have been above-described as converting between an AMBA protocol and an OCP. However, wrappers may convert between any well-known protocols.

Such variations are not to be regarded as departure from the spirit and scope of the example embodiments of the present invention, and all such modifications as would be obvious to one skilled in the art are intended to be included within the scope of the following claims.

What is claimed is:

1. A bus system, comprising:
   a first Intellectual Property (IP) core transferring data at a first time interval; and
   a second IP core connected to the first IP core via a wrapper through a bus and transferring data at a second time interval, a portion of the second time interval overlapping with a portion of the first time interval.

2. A method of transferring data, comprising:
   transferring data at a first Intellectual Property (IP) core at a first time interval; and
   transferring data at a second IP core, the second IP core being connected to the first IP core via a wrapper through a bus, at a second time interval, a portion of the second time interval overlapping with a portion of the first time interval.

3. The method of claim 2, wherein the first IP is connected to a first agent through a first wrapper and the second IP is connected to a second agent through a second wrapper.

4. A bus system for performing the method of claim 2.

5. A bus system, comprising:
   a first Intellectual Property (IP) core including a master block and a slave block; and
   a wrapper connecting the master block and the slave block to a bus, the wrapper applying a first data transmission state signal to the master block and a second data transmission state signal to the slave block, the first and second data transmission state signals indicating a concurrent permission to transfer data,
   wherein the slave block receives data from a second IP core connected to the bus when the master block is in a wait state.

6. The bus system of claim 5, wherein the IP core is based on at least one of an open core protocol (OCP) and an Advanced Microcontroller Bus Architecture (AMBA) protocol.

7. The bus system of claim 5, wherein the first and second data transmission state signals set a data transfer state of the master block and the slave block.

8. The bus system of claim 5, wherein the slave block includes a register.

9. The bus system of claim 5, wherein the first data transmission state signal is at a first logic level in the wait state.

10. The bus system of claim 9, wherein the first logic level is at least one of a low logic level and a high logic level.

11. The bus system of claim 5, wherein the received data sets a state of the master block.

12. The bus system of claim 5, wherein the wrapper comprises:
    a master wrapper connecting the master block and the bus; and
    a slave wrapper connecting the slave block and the bus.

13. The bus system of claim 12, wherein the master wrapper applies the first data transmission signal to the master block.

14. The bus system of claim 12, wherein the slave wrapper applies the second data transmission state signal to the slave block.

15. A bus system, comprising:
    a plurality of wrappers connecting a plurality of Intellectual Property (IP) cores to a bus, at least one of the plurality of IP cores including a master block and a slave block;
    wherein one of the plurality of wrappers, connected to the at least one of the plurality of IP cores, applies a first data transmission state signal to the master block and a second transmission state signal to the slave block, the first and second data transmission state signals indicating a concurrent permission to transfer data, and the slave block receives data from another of the plurality of IP cores connected to the bus when the master block is in a wait state.

16. The bus system of claim 15, wherein the plurality of IP cores are based on at least one of an open core protocol (OCP) and an Advanced Microcontroller Bus Architecture (AMBA) protocol.

17. The bus system of claim 16, wherein the first data transmission state signal is a HREADY signal of the AMBA protocol.

18. The bus system of claim 15, wherein the received data sets a state of the master block.

19. The bus system of claim 15, wherein the first data transmission state signal is at a first logic level in the wait state.

20. The bus system of claim 19, wherein the first logic level is at least one of a low logic level and a high logic level.

21. The bus system of claim 15, wherein the slave block includes a register.

22. The bus system of claim 15, wherein at least one of the plurality of wrappers performs a protocol conversion between one of the plurality of IP cores and the bus.

23. The bus system of claim 15, wherein the one of the plurality of wrappers includes a master wrapper connected between the master block and the bus and a slave wrapper connected between the slave block and the bus.

24. The bus system of claim 23, wherein the master wrapper applies the first data transmission state signal to the master block.

25. The bus system of claim 23, wherein the slave wrapper applies the second data transmission state signal to the slave block.

26. A bus system, comprising:
   a first Intellectual Property (IP) core including a master block and a slave block;
   a master wrapper connecting the master block to a bus, the master wrapper applying a first data transmission state signal to the master block, the first data transmission state signal indicating a permission to transfer data; and
   a slave wrapper connecting the slave block to the bus, the slave wrapper applying a second data transmission state signal to the slave block, the second data transmission state signal indicating a concurrent permission to transfer data,
   wherein the slave block receives data from a second IP core connected to the bus when the master block is in a wait state.

27. The bus system of claim 26, wherein the IP core is based on at least one of an open core protocol (OCP) and an Advanced Microcontroller Bus Architecture (AMBA) protocol.

28. The bus system of claim 26, wherein the received data sets a state of the master block.

29. The bus system of claim 26, wherein the first data transmission state signal is at a first logic level in the wait state.

30. The bus system of claim 29, wherein the first logic level includes at least one of a low logic level and a high logic level.

31. The bus system of claim 26, wherein the slave block includes a register.

32. A method of operating a bus system, comprising:
   connecting a first Intellectual Property (IP) core including a master block and a slave block to a bus via a wrapper, the wrapper applying a first data transmission state signal to the master block and a second data transmission state signal to the slave block, the first and second data transmission state signals indicating a concurrent permission to transfer data,
   wherein the slave block receives data from a second IP core connected to the bus when the master block is in a wait state.

33. The method of claim 32, wherein the IP core is based on at least one of an open core protocol (OCP) and an Advanced Microcontroller Bus Architecture (AMBA) protocol.

34. The method of claim 32, wherein the first data transmission state signal is at a first logic level in the wait state.

35. The method of claim 34, wherein the first logic level includes at least one of a low logic level and a high logic level.

36. A bus system for performing the method of claim 32.

* * * * *